(12) United States Patent
Vanghi

(10) Patent No.: US 7,221,653 B2
(45) Date of Patent: May 22, 2007

(54) FAST FLOW CONTROL METHODS FOR COMMUNICATION NETWORKS

(75) Inventor: Vieri Vanghi, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 1070 days.

(21) Appl. No.: 09/918,020

(22) Filed: Jul. 30, 2001

(65) Prior Publication Data

US 2003/0031130 A1    Feb. 13, 2003

(51) Int. Cl.
*G01R 31/08* (2006.01)

(52) U.S. Cl. .................. 370/252; 370/329; 370/468; 455/67.13

(58) Field of Classification Search ............. 370/252, 370/329, 468; 455/452.2, 452.1, 453, 454, 455/63.1, 67.11, 67.13
See application file for complete search history.

(56) References Cited

U.S. PATENT DOCUMENTS

| | | | | |
|---|---|---|---|---|
| 5,596,333 A | * | 1/1997 | Bruckert | 342/457 |
| 5,960,349 A | * | 9/1999 | Chheda et al. | 455/446 |
| 6,108,321 A | * | 8/2000 | Anderson et al. | 370/329 |
| 6,151,512 A | * | 11/2000 | Chheda et al. | 455/562.1 |
| 6,154,638 A | * | 11/2000 | Cheng et al. | 455/67.11 |
| 6,188,914 B1 | * | 2/2001 | Chheda | 455/562.1 |
| 6,223,041 B1 | * | 4/2001 | Egner et al. | 455/452.2 |
| 6,442,398 B1 | * | 8/2002 | Padovani et al. | 455/522 |
| 6,487,416 B1 | * | 11/2002 | Bundy et al. | 455/453 |
| 6,549,781 B1 | * | 4/2003 | O'Byrne et al. | 455/446 |
| 6,671,512 B2 | * | 12/2003 | Laakso | 455/453 |
| 2002/0151310 A1 | * | 10/2002 | Chung et al. | 455/452 |
| 2002/0154610 A1 | * | 10/2002 | Tiedemann et al. | 370/329 |
| 2003/0021334 A1 | * | 1/2003 | Levin et al. | 375/147 |
| 2003/0076795 A1 | * | 4/2003 | Bender et al. | 370/332 |

\* cited by examiner

*Primary Examiner*—Chau Nguyen
*Assistant Examiner*—Jung Park
(74) *Attorney, Agent, or Firm*—Coats & Bennett, P.L.L.C.

(57) ABSTRACT

Reverse link flow control in a high data rate network determines current reverse link data channel rates for access terminals served by a network sector to identify corresponding defined channel gains, which are used to rapidly and reliably estimate total sector interference on the reverse link. Total sector interference indicates reverse link capacity utilization, and when remaining capacity approaches a defined threshold, the sector sets an activity indicator to a busy state indicating reverse link congestion. This action causes at least some access terminals to reduce their reverse link data channel rate. Interference calculation techniques preferably involve baseband digital processing using defined channel gains, permitting rapid evaluation of reverse link capacity and quick, reliable activity indicator updating, which increases reverse link capacity utilization. These techniques may be applied to inter-sector control, wherein the reverse activity indicator status for one sector depends on interference in one or more other sectors.

51 Claims, 3 Drawing Sheets

FAST FLOW CONTROL METHODS FOR COMMUNICATION NETWORKS

BACKGROUND OF THE INVENTION

The present invention relates generally to high rate packet data networks for mobile communications and, more particularly, for high rate packet data networks.

The Telecommunications Industry Association (TIA) recently adopted a new specification for high rate packet data services known as TIA/EIA/IS-856 "cdma2000, High Rate Packet Data Air Interface Specification." Communication networks based on this standard can provide up to 2.4 Mbps in a standard bandwidth 1.25 MHz channel.

In HDR networks, the reverse link traffic channel between the access terminal and the access network is a variable rate channel. The access terminal selects the data rate from among one of five possible data rates and can change the data rate on a packet-by-packet basis without negotiation with the access network. Therefore, the amount of reverse link interference experienced by the base station receiver varies rapidly and by large amounts. A fast flow control method is therefore needed to prevent congestion on the reverse link communication channel.

The TIA/EIA/IS-856 standard describes a flow control method that uses the reverse activity (RA) channel to regulate traffic flow on the reverse link communication channel. More particularly, flow control is accomplished by transmitting a "busy" signal from the access network to the access terminals that throttles back the data rate permissible by the access terminals served by the base station. The busy signal is carried by the Reverse Activity (RA) channel, which is typically broadcast by each radio base station in the access network, where the coverage area of each radio base station defines a sector. Reverse link loading is estimated for a sector by measuring the total received signal power, which is accomplished by reading the control voltage of the base station receiver automatic gain control (AGC) module, and comparing it against the nominal receiver noise figure. The reverse link load estimate is then compared against an overload threshold to control the RA channel busy signal.

The AGC measurements required for flow control under the TIA/EIA/IS-856 standard are analog in nature and noisy. Therefore, AGC measurements must be low pass filtered in order to enhance their reliability. The time constant for low pass filtering is typically in the order of 1.28 seconds. Thus, low pass filtering introduces delay in the generation of reverse link loading estimates, which, in turn, increases the response time of the base station to changes in reverse link loading. The longer response time means that the base station may not be able to track fast changes in reverse link loading and may, therefore, be ineffective under such conditions.

Another disadvantage of the prior art flow control method is that reverse link load estimates based on AGC measurements and nominal receiver noise values are highly inaccurate. The receiver noise figure can be measured only in the factory during equipment calibration and varies with temperature and aging of components. So that the noise figure is used as a reference in the reverse link load estimation, any inaccuracy in the noise figure nominal value directly affects the accuracy of the reverse link load estimation.

Accordingly, an improved method and apparatus for flow control that is capable of tracking fast changes in reverse link loading are needed.

BRIEF SUMMARY OF THE INVENTION

Basing reverse link flow control in a wireless communication network on access terminal interference estimates derived from access terminal reverse data channel rates allows rapid reverse link flow control adjustment, thereby enhancing reverse link capacity utilization. For example, in a high rate packet data network based on the TIA/EIA/IS-856 standard, the reverse activity channel may be controlled by determining reverse link reserve capacity based on total sector interference, which depends on reverse link loading. Total sector interference in turn may be determined by estimating the individual interference contribution of each access terminal served by that sector. The interference contributed by each access terminal consists of the received reverse pilot channel power, reverse data channel power, and data rate control (DRC) channel power. The pilot channel received power must be estimated. The data channel received power can be computed based on the pilot received power, given the data channel gain relative to the pilot. The data channel gain relative to the pilot depends on the transmit data rate in use by each access terminal, which may be obtained from information transmitted by the terminal on the Reverse Rate Indicator (RRI) channel. The DRC channel received power can also be computed based on the pilot received power, given the DRC channel gain relative to the pilot. These channel gain values are known by the sector for all defined reverse data channel rates.

In operation, a given sector within the network operates within defined reverse link capacity limits. These capacity limits essentially define a maximum reverse link throughput. Reverse link capacity utilization depends on the number of terminals transmitting reverse link traffic and the data rates used by those terminals. If capacity usage approaches a maximum threshold, the sector uses the reverse activity (RA) channel to indicate congestion. In response, a number of access terminals reduce their reverse data channel rates, thereby reducing reverse link capacity utilization. With the present invention, estimation of remaining reverse link capacity uses pilot channel received power signal to noise ratio estimates and known channel gains that are defined by the air interface standard, rather than using slow and potentially inaccurate noise floor measurements at the radio base station serving the sector.

An exemplary approach to implementing the above control scheme determines the individual interference contribution for each connection (access terminal) supported by the sector. For networks based on the TIA/EIA/IS-856 standard, this entails determining first and second channel gains for the Reverse Traffic Data Channel and the Reverse Traffic MAC Data Rate Control (DRC) Channel, respectively. These gains are specified by the standard and thus are known to the sector. However, the sector must know the reverse data channel rate used by the access terminal, since the first gain value is rate-dependent. The access terminal provides this information by transmitting an indication of its reverse data channel rate on the Reverse Traffic MAC Reverse Rate Indicator (RRI) Channel. With the first and second gain values thus determined, the individual contribution may be taken as the product of the access terminal's Pilot Channel signal-to-noise ratio (pilot SNR) and the combined gain values. Summing the individual contributions of the entire set of access terminals served by the sector provides estimated total sector interference.

Pilot SNR may be a measured value, such as that provided by radio base station demodulation circuits for each access terminal, or may be a taken as a nominal value commonly used for all access terminals. In some instances, using a nominal Pilot SNR may introduce error, at least for those access terminals being power controlled by adjacent sectors under soft handoff conditions. In these instances, the individual interference contribution of access terminals that are in soft handoff may be adjusted using a weighting factor. In an exemplary approach, the weighting factor applied to a given terminal's interference contribution depends on the packet error rate (PER) of that terminal. Here, an access terminal operating under an adjacent sector's power control may be expected to exhibit a higher PER. Thus, if the PER exceeds a defined threshold, the interference contribution may be fractionally reduced or set to zero. Fractional reduction may further consider the number of sectors involved in the terminal's soft handoff condition, such that fractional reduction increases with an increasing number of involved sectors.

In other approaches to reverse link flow control where soft handoff issues are considered, reverse link flow control involves interdependent reverse link flow control of multiple sectors. Interdependent control contemplates adjusting the reverse data channel rates of access terminals in one or more adjacent sectors to reduce interference in a sector of interest, or to maximize capacity of the access network. Since the communication traffic carried by one sector contributes to interference in adjacent sectors, it may be desirable to reduce the reverse link data rates used by access terminals in one sector, thereby reducing adjacent sector interference. This allows higher throughput in one or more of the adjacent sectors, and may result in a net increase in overall network capacity.

Preferably, with interdependent control, a central processing site receives sector interference information from a number of sectors and provides feedback information to one or more of those sectors so as to reduce reverse link interference in one or more of the sectors. In some embodiments, the feedback information comprises reverse link reserve capacity threshold settings used by the sectors in determining whether or not to set the reverse link activity indicator to "busy" based on current reverse link capacity utilization. Thus, by sending a reduced threshold value to a given sector, that sector more readily requests the access terminals served by it to reduce their reverse data channel rates in the interest of reducing intersector interference.

DETAILED DESCRIPTION OF THE INVENTION

Figure 1:
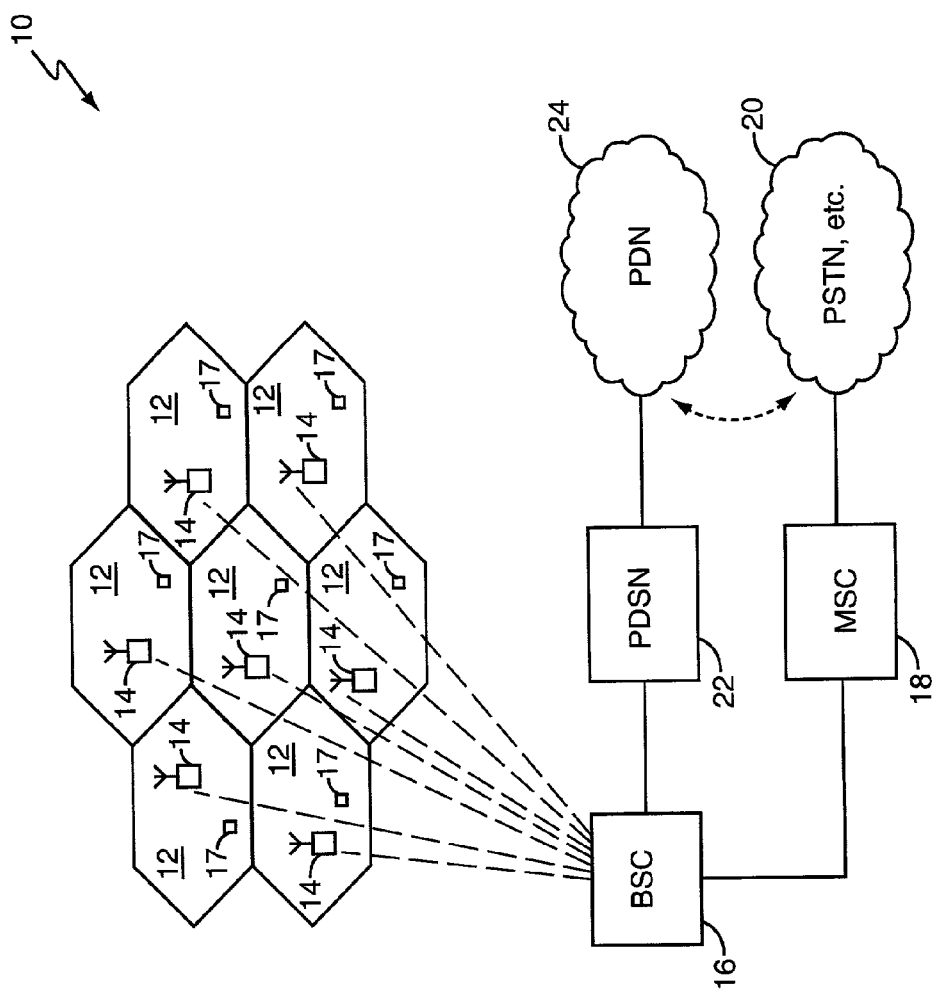
FIG. 1 is a diagram of a wireless communication access network, which may be a high rate packet data access network.

FIG. 1 illustrates a simplified wireless communication access network generally referred to by the numeral 10, and which may be, for example, a high rate packet data network configured in accordance with the TIA/EIA/IS-856 standard. While this specific air interface standard provides a directly relevant context for discussing the invention, it should be understood that at least some aspects of the present invention have applicability beyond this standard.

Network 10 as illustrated comprises a plurality of sectors 12, each served by a radio base station (RBS) 14, a base station controller (BSC) 14 supporting the RBSs 12, a mobile switching center (MSC) 18 interfacing the network 10 to one or more external networks 20, and a packet data service node (PDSN) 22 interfacing the network 10 to one or more packet data networks 24. Examples of networks 20 and 24 include but are not limited to the Public Switched Telephone Network (PSTN) and the Internet, respectively.

Typically, each sector 12 serves a plurality of access terminals 17, although only a few terminals 17 are illustrated for clarity. The network 10 communicates with each active access terminal 17 on forward link channels, while each terminal 17 communicates with the network 10 on reverse link channels. Some forward and reverse link channels are shared by multiple terminals 17 while certain other channels on both links are dedicated to individual ones of the terminals 17. If the network 10 is configured in accordance with the TIA/EIA/IS-856 standard for high rate packet data communication, reverse link flow control regulates the data rate used by access terminals on the reverse link traffic data channel, sometimes referred to herein simply as the "reverse data channel."

With reverse link flow control, the network 10 regulates reverse link data rates to prevent congestion within the sectors 12. Each sector 12 is served by one or more RBSs 14 as illustrated, although the diagram of FIG. 1 should not be taken as a literal depiction of RBS layout within the sectors 12. Thus, each sector 12 has a maximum reverse link throughput available for serving the terminals 17 active within the sector 12. As more terminals 17 become active within a given one of the sectors 12, the reverse link loading on the sector 12 tends to increase and congestion may arise if the reverse link becomes overloaded.

The TIA/EIA/IS-856 standard defines five data rates for the reverse data channel used by access terminals 17 to transmit user data to the network 10. In general, access terminals 17 communicating with the network 10 via reverse data channels use the highest defined data rate possible, subject to reverse link flow control, which operates to prevent congestion. Thus, within a given serving sector 12, a smaller group of active access terminals will, on average, communicate with the network 10 at a higher data rate than will a larger group of active access terminals 17. This arises because total reverse link capacity within a sector 12 is fixed, so a small number of terminals 17 may approach maximum reverse link throughput by using a high average data rate, while a large number of terminals 17 may approach maximum reverse link throughput using a relatively lower average data rate.

The network 10 uses a reverse activity (RA) indicator channel to indicate congestion. Terminals 17 operating under control of a given sector 12 regulate their data rates on the reverse data channel responsive to the status or state of the RA indicator transmitted from the sector 12. Thus, when reverse link loading in the sector 12 approaches undesirably high levels that portend reverse link congestion, the RBS 14 in that sector 12 may change the RA indicator from a "not busy" status to a "busy" status. In response, at least some of the terminals 17 operating under control of that sector reduce their reverse data channel rates. The terminals 17 uses statistical techniques in deciding whether or not to reduce their reverse data channel rate, thus not every terminal controlled by the sector 12 reduces its data rate when the RA indicator changes from "not busy" to "busy." In the TIA/EIA/IS-856 standard, terminals 17 may adjust this rate on a packet-by-packet basis meaning rate adjustments may potentially be made every 26.7 ms in accordance with nominal frame timing in that standard.

However, this implies that the RA indicators used in each of the sectors can be updated fast enough to allow for such rapid rate adjustments. Incentives for achieving rapid RA indicator status updating, and thereby achieving fast reverse link flow control, are numerous. For example, with fast reverse link flow control, reverse link capacity is more efficiently used. This tendency toward greater efficiency arises because the network 10 is able to more quickly respond to actual changes in reverse link loading at the sectors 12, and thus provide RA indicators that more immediately correspond to actual loading conditions. Unfortunately, conventional approaches to estimating reverse link loading or remaining reverse link capacity within the sectors 12 use power measurements, or some other analog measurement techniques.

Typically, each RBS 14 includes one or more receivers for receiving signals transmitted from the terminals 17 on the reverse link. These receivers usually have some form of automatic gain control (AGC) circuit that compensates for changes in the receiver's noise flow caused by changing reverse link interference within the sector 12 in which the RBS 14 is located. More particularly, AGC circuits typically work to maintain the received signal within a given range to avoid saturation in analog-to-digital conversion of the signal. With conventional approaches, the AGC circuit control voltage may be used to infer reverse link interference because that voltage is a function of the reverse link interference. In turn reverse link interference is a function of reverse link loading. Thus, the total reverse link interference in a given sector 12 may be used as an indicator of the reverse link loading in that sector. Computing total sector interference for the reverse link using AGC measurements is slow (e.g., <1 Hz) and inaccurate. The slowness stems for the need to aggressively low-pass filter the measurements due to noise, while the inaccuracy arise from a number of sources, including the dependence of the receiver's noise figure which changes over time.

With the present invention, total sector interference estimation is more accurate and significantly faster. Indeed, based on TIA/EIA/IS-856 standard specification, interference estimates may be updated essentially at the rate access terminal reverse rate information is updated. With access terminal transmission times staggered at 1/16 of a frame (26.7 ms), new rate information is available every 26.7/16 ms, which is approximately 600 Hz. With the ability to update interference estimates at this rate, the estimates may be filtered for enhanced stability, while still meeting the full bandwidth of the standard-defined maximum reverse link flow control update rate of 75 Hz. Thus, with the present invention, the RA status indicators used by the sectors 12 comprising the network 10 may be updated at 75 Hz or smaller, and with enhanced accuracy as compared to conventional approaches.

In more detail, the remaining or reserve reverse link capacity, which may be referred to as the reverse link excess capacity, within each sector 12 may be computed based on estimating the total sector interference for the reverse link using baseband digital processing rather than slow and inaccurate analog power measurements. The remaining capacity may be compared to one or more threshold values to determine whether the sector 12 is approaching a congested condition, and the RA indicator for that sector 12 may be set appropriately.

An exemplary approach to estimating reverse link reserve capacity is given by the following equation, $$R_{EXC} = 1 - \sum_{i=0}^{N-1} Pilot\frac{E_{c,i}}{I_O}\left(\frac{Data\ E_c(R_i)}{Pilot\ E_c} + \frac{DRC\ E_{c,i}}{Pilot\ E_c} + 1\right), \quad \text{(Eq. 1)}$$

where $R_{EXC}$ indicates reserve or excess capacity in a sector 12 within the network 10, Pilot Ec,i/Io is pilot channel signal-to-noise ratio (SNR) for the "$i^{th}$" connection in the sector (e.g., the $i^{th}$ access terminal 17 served by the sector 12), Data Ec(Ri)/Pilot Ec is the reverse data channel gain for the $i^{th}$ connection expressed as a ratio of reverse data channel chip energy at the $i^{th}$ connection's current reverse data channel data rate Ri to pilot channel chip energy, and DRC Ec,i/Pilot Ec is the channel gain for the reverse data rate control (DRC) channel for the $i^{th}$ connection expressed as a ratio of DRC channel chip energy to pilot chip energy.

Thus, in Equation 1 above, the given sector 12 serves N access terminals 17, each one contributing to the total reverse link interference in the sector 12. This total interference is estimated by summing the individual contributions of interference from each connection i over the total number N of connections (e.g., access terminals 17) supported by the sector 12. Because reverse link loading or utilized capacity may be inferred from total reverse link interference, Equation 1 allows rapid, accurate computation of reverse link loading for the sector 12.

From Equation 1, the $i^{th}$ connection's individual contribution to total reverse link interference is given as, $$I_{IND} = Pilot\frac{E_{c,i}}{I_O}\left(\frac{Data\ E_c(R_i)}{Pilot\ E_c} + \frac{DRC\ E_{c,i}}{Pilot\ E_c} + 1\right), \quad \text{(Eq. 2)}$$

where, as before, the first term in the parenthetical sum is the reverse data channel gain, which depends on the current data rate used by the terminal associated with the $i^{th}$ connection on the reverse data channel, and the second term in the parenthetical sum is the DRC channel gain for the $i^{th}$ connection.

As will be explained in more detail later, the $i^{th}$ connection's pilot SNR may be measured, or may be estimated as a nominal value. Regardless, the first and second channel gains in Equation 2 are defined by the TIA/EIA/IS-856 standard. Thus, look-up tables or other data structures may be stored in memories accessible to the RBSs 14, such that determining individual interference contributions becomes largely a matter of looking up predefined channel gain information. As noted above, the TIA/EIA/IS-856 standard defines five permissible reverse data channel rates, thus configuring the stored channel gain information with all possible reverse data channel gain values is preferable. With this approach, interference estimation is a matter of baseband digital signal processing, which may be performed at high-speed and with good reliability.

Selecting the correct reverse data channel gain value from the stored information for the $i^{th}$ connection requires knowledge of the current or last data rate for the reverse data channel used by the terminal 17 associated with the $i^{th}$ connection. This information may be obtained from the reverse rate indicator (RRI) information transmitted from the terminal 17 to the network 10. In general, each terminal 17 transmits information about the current reverse data channel rate of the terminal 17 in the form of RRI symbols.

The serving RBS 14 determines the current rate by demodulating these symbols, which are provided to the RBS 14 at up to 600 Hz. Thus, the RBS 14 can update the individual contributions to total sector interference at that rate. Each RBS 14 is therefore able to revise its current estimate of reverse link reserve capacity at up to 600 Hz, although in practice it may apply filtering to smooth estimated total sector interference.

Figure 2:
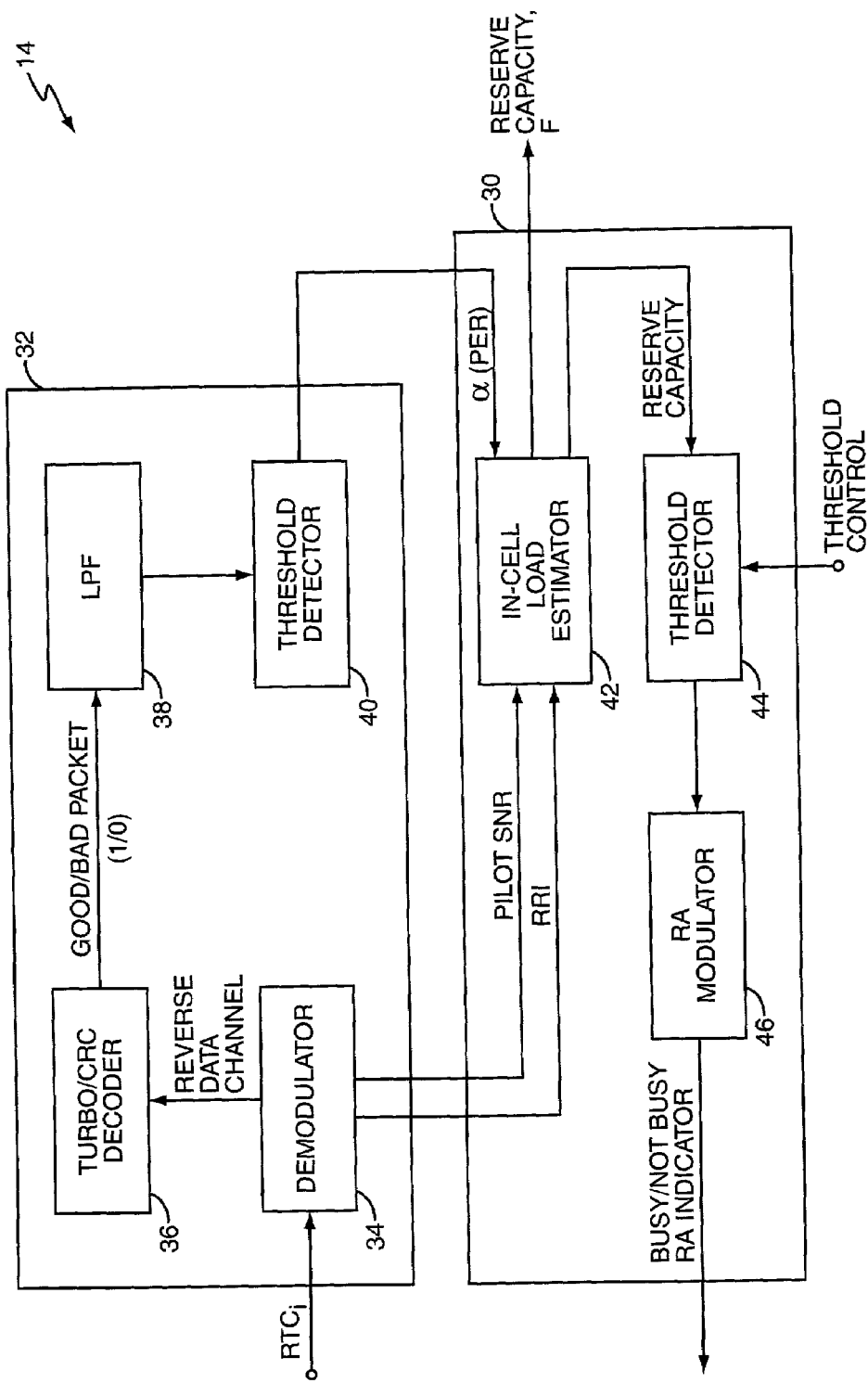
FIG. 2 is a diagram of an exemplary radio base station for use in the network of FIG. 1.

FIG. 2 illustrates a simplified RBS 14 adapted to perform RA indicator modulation based on the above approach to total sector interference estimation. The RBS 14 comprises a radio base station processing system 30, and a plurality of channel interfaces 32. In the diagram, only one interface 32 is shown for simplicity, but it should be understood that each open connection supported by the RBS 14 has an interface 32 dedicated to it. The interface 32 comprises, in this exemplary embodiment, a demodulator 34, a decoder 36, a low-pass filter (LPF) 38, and a first threshold detector 40. The system 30, again in this exemplary embodiment, comprises an in-cell load estimator 42, a second threshold detector 44, and a RA modulator 46.

In operation, the system 30 receives information from the interfaces 32 for each open connection supported by the RBS 14, and uses this information to calculate reverse link loading. Thus, for N access terminals 17 having open connections with the RBS 14, there are N interfaces 32 providing information bearing on the individual interference contributions of each of the N terminals 17. For the $i^{th}$ connection, the system 30 preferably receives pilot SNR, RRI, and may receive $\alpha(PER)$, where $\alpha(PER)$ is a function of the packet error rate (PER) of the $i^{th}$ terminal 17.

With RRI and pilot SNR for each terminal 17, the system 30 determines the individual interference contribution of each terminal 17 served by the sector 12 in accordance with Equation 1 above. More particularly, in this embodiment, the load estimator 42, which includes or has access to a memory (not shown) containing defined channel gain information, performs the look-up functions required to determine the appropriate reverse data channel and reverse DRC channel gains used in determining the individual interference contributions of each terminal 17. In performing these look-up operations, the load estimator 42 uses each terminal's RRI information to select the correct reverse data channel gain for that terminal 17.

The output from load estimator 42 to the threshold detector 44 indicates the remaining reverse link capacity of the sector 12, and is preferably the output from Equation 1 above. The threshold detector 44 compares this capacity measurement to a defined capacity threshold and sets the RA modulator 46 appropriately. That is, if the sector's reverse link capacity utilization approaches a congested level, the threshold detector 44 causes the RA modulator 46 to set the RA indicator to a busy state, and, if not, causes the RA modulator 46 to set the RA indicator to a not busy state. Thus, $$\text{RA INDICATOR} = \begin{cases} \text{BUSY IF } R_{EXC} \leq R_{EXC\_MIN} \\ \text{NOT BUSY IF } R_{EXC} > R_{EXC\_MIN} \end{cases}, \quad \text{(Eq. 3)}$$

where $R_{EXC\_MIN}$ is a defined minimum reserve capacity threshold for the sector 12. This threshold value may be expressed as a percentage or fractional value of total reverse link capacity for the sector. For example, if 10% remaining capacity was deemed the minimum remaining capacity threshold, $R_{EXC\_MIN}$ might be set to a value of 0.10. Alternatively, the threshold detector 44 could be configured to compare current capacity usage to a maximum usage threshold. Thus, setting a maximum usage threshold of 0.90 (90%) is equivalent to setting a reserve threshold of 0.10. Equation 1 above may be configured to accommodate either comparison technique, yielding either remaining capacity or utilized capacity values.

Note that the load estimator 42 may low-pass filter the $R_{EXC}$ values for smoothing before outputting them to threshold detector 44. Alternatively, the threshold detector 44 may be implemented using hysteretic threshold values, comprising an upper threshold $R_{EXC\_MIN\_UPPER}$ and a lower threshold $R_{EXC\_MIN\_LOWER}$. With this scheme, the threshold detector 44 might cause the RA modulator 46 to set the RA indicator to busy when $R_{EXC}$ falls below $R_{EXC\_MIN\_LOWER}$, and cause it to set the RA indicator to not busy when $R_{EXC}$ rises above $R_{EXC\_MIN\_UPPER}$.

The demodulator 34 within interface 32 provides pilot SNR information to the load estimator 42. That is, the demodulator 34 in the $i^{th}$ interface 32 provides pilot SNR information about the $i^{th}$ terminal 17 to the load estimator 42. Those skilled in the art will recognize that pilot SNR determination is a common operation performed by demodulators, particular in code division multiple access (CDMA) receivers. However, in some instances, it may not be convenient to make the pilot SNR information determined within the demodulator 34 available to the load estimator 42. For example, the demodulator 34 is often implemented as an integrated circuit, which may or may not make pilot SNR information externally available in a form suitable for the load estimator 42.

If pilot SNR information is not available to the load estimator 42, a nominal value for pilot SNR may be used for all N terminals 17 served by the sector 12. Using a constant pilot SNR results in Equation 1 be rewritten as, $$R_{EXC} = 1 - Pilot\frac{E_c}{I_o} \sum_{i=0}^{N-1} \alpha(PER)\left(\frac{Data\ E_c(R_i)}{Pilot\ E_c} + \frac{DRC\ E_{c,i}}{Pilot\ E_c} + 1\right), \quad \text{(Eq. 4)}$$

where Pilot Ec/Io is now a constant, nominal value assumed for all N terminals 17.

If the network 10 implements reverse link power control, the assumption of a nominal pilot SNR value will not introduce undue error, since reverse link power control strives to maintain the pilot SNR values for each access terminal 17 substantially at a nominal value. However, not all terminals 17 within a given sector 12 operate under power control of that sector. For example, at any given time within the network 10, some number of terminals 17 will be in soft handoff between two or more sectors 12. That is, a given terminal 17 will simultaneously have open connections with more than one RBS 14, but will be reverse-link power controlled by only one RBS 14. This means, that within a given sector 12, the assumed nominal pilot SNR value will likely not be accurate for those terminals 17 that have open connections with the given sector but operate under power control of another sector (i.e., terminals 17 in soft handoff).

One effect of soft handoff is that the packet error rate (PER) tends to be higher for a terminal 17 in soft handoff for all but the sector 12 controlling the terminal's reverse link power, since the terminal's reverse link power is nominal only for that controlling sector 12. Thus, Equation 4 is made more accurate by the inclusion of α(PER) which acts as a scaling or weighting factor for the individual contributions to total sector interference. For example, a high PER indicates that a given terminal 17 is in soft handoff and being power controlled by another sector 12. Thus, the nominal pilot SNR is likely not accurate for use in calculating that terminal's individual contribution. The weighting factor α(PER) may be used to de-emphasize the individual contribution of such terminals 17 to the total sector interference estimate determined for a sector 12 by setting α(PER) as, $$\alpha(PER) = \begin{cases} 1 & \text{IF } PER \leq PER_{MAX} \\ \beta & \text{IF } PER > PER_{MAX} \end{cases}, \quad \text{(Eq. 5)}$$

where $PER_{MAX}$ is a defined threshold for the PER, and β is a defined scaling factor. For example, β may be set to −3 dB, thus de-emphasizing the individual contributions to total sector interference from terminals 17 with excessive PER. Alternatively, β may simply be set to zero (0), such that Equation 5 thus ignores altogether the individual contributions from terminals 17 having excessive PER. Another possible approach is to scale β as a function the number of sectors 12 involved in the soft handoff condition. That is, in soft handoff, a terminal's active set includes all the sectors 12 supporting the terminal 17. As the size of the active set increases, β may be decreased accordingly. The logic behind this approach is that as the active set grows larger, the possible disparity between nominal pilot SNR and actual pilot SNR increases within a given sector 12 in the terminal's active set.

The demodulator 34 also provides demodulated symbol information for the reverse data channel to the decoder 36, which works with convolutional encoding, as well as with Turbo encoding. The decoder 36 outputs a good/bad packet indicator, denoting whether the current packet from the ith terminal 17 did or did not contain errors. Preferably, the decoder outputs a stream of 1 s and 0s corresponding to successive good and bad packets. The LPF 38 may be used to average these 1s and 0s to produce a smoothed PER function, which the threshold detector 40 uses to generate α(PER).

While the above discussion focused on per-sector reverse link flow control, the computational advantages of the above techniques may be applied to inter-sector reverse link flow control, wherein reverse link flow control in one sector 12 depends on the congestion or interference in one or more other sectors 12. That is, with inter-sector flow control, reverse link flow control preferably seeks to optimize reverse link flow across a number of sectors 12 within the network 10.

Figure 3:
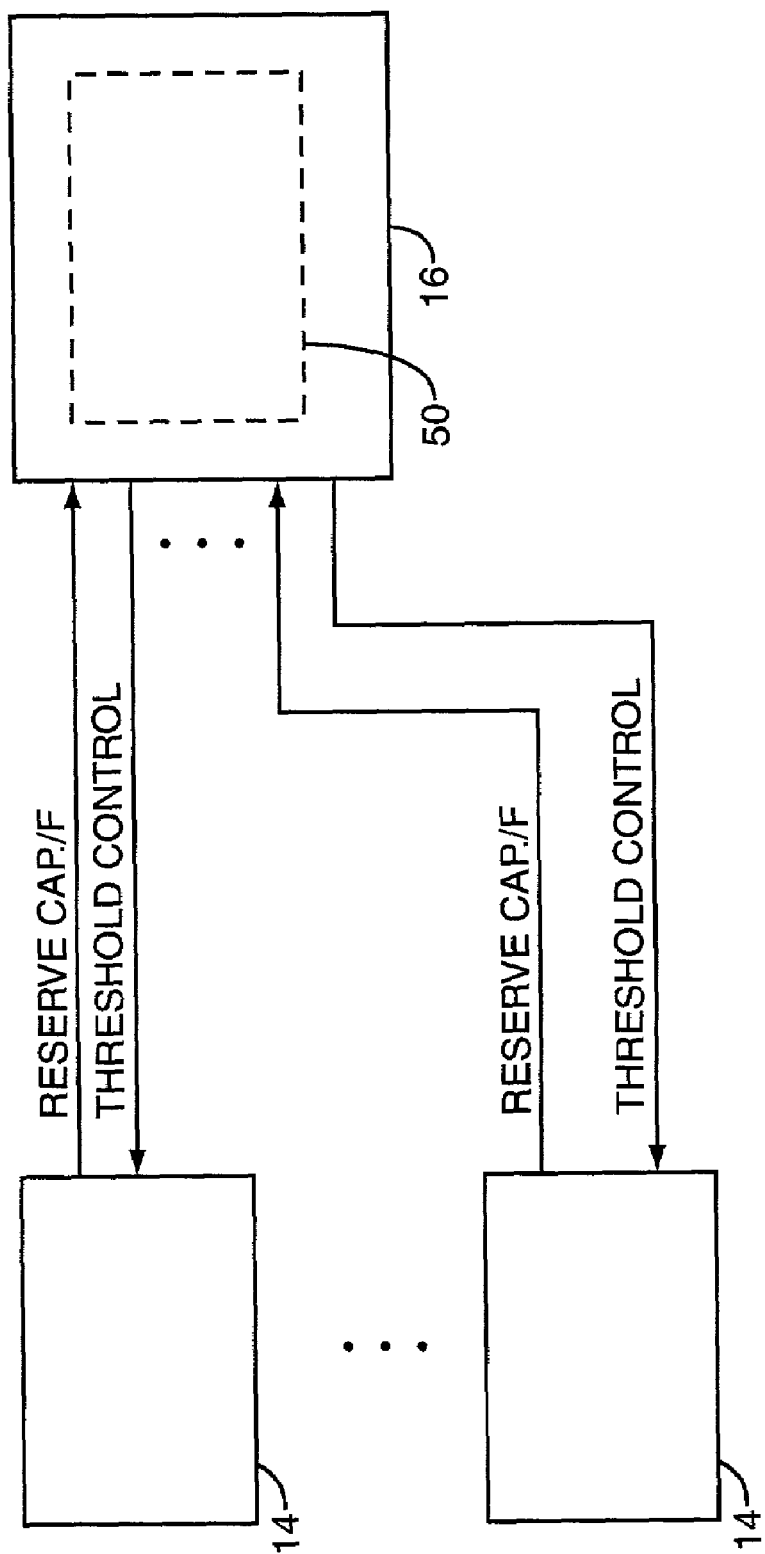
FIG. 3 is a diagram of an exemplary base station controller for use in the network of FIG. 1.

FIG. 3 illustrates an exemplary approach to inter-sector flow control and builds on the details of FIG. 2. The BSC 16 comprises a central processor adapted to receive reserve capacity and frequency reuse information from a number of RBSs 14. The BSC 16 typically has one or more communication interfaces between it and the RBSs 14 it controls. These communication interfaces may comprise, for example, T1/E1 communication links, which allow the BSC 16 to synchronously communicate with multiple RBSs 14.

The BSC 16 uses the information it receives from the RBSs 14 to adjust the capacity threshold values used by threshold detectors 44 within the system 30 included in each RBS 14.

This allows the BSC 16 to change the capacity utilization level at which each sector 12 changes its RA indicator from not busy to busy. Refer to FIG. 2 for illustration of a threshold control input to the threshold detector 44. Also, FIG. 2 depicts the load estimator 42 providing reserve capacity and frequency reuse information outputs, which are advantageously used by the central processor 50 in implementing inter-sector flow control.

Much of the reverse link interference in one sector 12 originates from terminals 17 served by nearby sectors 12, thus per-sector flow control misses an opportunity to reduce interference and increase reverse link capacity utilization by cooperatively regulating reverse link flow across a group of sectors 12. For perspective, in an ideal hexagonal layout of 3-sector cells, the outer cell interference typically accounts for 65% of the total received interference within a given sector 12.

The frequency reuse efficiency of a sector may be defined as F, where $F = I_{TOT}/I_{IC}$, where $I_{TOT}$ is the total received power and $I_{IC}$ is the in-cell interference power. Since the received power from all terminals 17 in soft handoff in a given sector 12 that are power controlled by another sector 12 account almost entirely for the outer cell interference, the frequency reuse efficiency for the sector 12 may be estimated as, $$F = \frac{\sum_{i=0}^{N_{IC}-1} Pilot \frac{E_{c,i}}{I_0} \left( \frac{Data\ E_c(Ri)}{Pilot\ E_c} + \frac{DRC\ E_{c,i}}{Pilot\ E_c} + 1 \right) + \sum_{i=0}^{N_{OC}-1} Pilot \frac{E_{c,i}}{I_0} \left( \frac{Data\ E_c(Ri)}{Pilot\ E_c} + \frac{DRC\ E_{c,i}}{Pilot\ E_c} + 1 \right)}{\sum_{i=0}^{N_{IC}-1} Pilot \frac{E_{c,i}}{I_0} \left( \frac{Data\ E_c(Ri)}{Pilot\ E_c} + \frac{DRC\ E_{c,i}}{Pilot\ E_c} + 1 \right)}, \quad \text{(Eq. 6)}$$

where $N_{IC}$ and $N_{OC}$ are the number of terminals 17 that contribute to the in-cell and outer-cell interference, respectively. The above expression may be simplified in terms of total interference, in-cell interference, and outer-cell interference, giving F as, $$F = \frac{I_{IC} + IOC}{I_{IC}}, \quad \text{(Eq. 7)}$$

where $I_{IC}$ is in-cell interference as above, $I_{OC}$ is outer-cell interference, and $I_{TOT}$ is the sum of $I_{IC}$ and $I_{OC}$.

$N_{IC}$ and $N_{OC}$ can be estimated by comparing the average received pilot SNR of each terminal 17, or, similar to Equation 4 earlier, terminals 17 whose PER falls outside a defined threshold may be considered as belonging to the set of $N_{OC}$ outer-cell terminals 17 for the sector 12. Terminals 17 whose measured pilot SNR falls within an allowable range of the nominal pilot SNR for the sector 12 or terminals 17 whose PER is below a maximum PER threshold are considered as belonging to the set of $N_{IC}$ in-cell terminals 17 for the sector 12.

Preferably all sector RBSs 14 periodically send $R_{EXC}$ and F information to the central processor 50 of BSC 16. The BSC 16 maintains neighborhood information for each sector 12. That is, the BSC 16 maintains for each sector 12 a list of adjacent sectors 12 contributing to the outer-cell interference in the sector 12. If the estimated $R_{EXC}$ value from a given sector 12 is low and the estimated F for that sector is high, the central processor 50 can reduce the data rate used by terminals 17 in one or more neighboring sectors 12 to reduce the interference experienced by the given sector 12.

The central processor 50 may accomplish this by changing the capacity threshold used by threshold detectors 44 within the RBSs 14 in the one or more neighboring sectors 12. That is, by setting the permissible residual capacity in the neighboring sectors 12 appropriately, the central processor 50 can cause these neighboring sectors 12 to set their RA indicators to the busy state, thereby causing at least some of the terminals 17 served by those neighboring sectors 12 to reduce their data rates.

Thus, the baseband processing involving pre-defined channel gain values first introduced for use in reverse link flow control may also be used in inter-sector reverse link flow control. In both cases, estimation of reverse link loading as indicated by total sector interference in each sector 12 may be performed rapidly using pre-defined channel gain values and measured or estimated pilot SNR values for each terminal 17 served by the sector 12. These calculations avoid slow and inaccurate power measurements, and in networks 10 based on the current TIA/EIA/IS-856 standard, allow for RA indicator updating at up to 600 Hz, which is the rate at which updated RRI information is available from the terminals 17 in a given sector 12, as explained earlier.

In the above discussion, various thresholds were used in reverse link flow control procedures. For example, in the per-sector approach to flow control, the RBS 14 within a given sector 12 included a threshold detector 44 that compared used or reserve reverse link capacity to a defined threshold and set the RA indicator to busy or not busy based on the comparison. Thresholds were also used in determining how to scale individual contributions from terminals 17 with high PER, to de-emphasize the individual contributions from terminals 17 in soft handoff that were operating under another sector's power control. These thresholds, along with any other comparison threshold or defined set point that might also be used in the above processes, are preferably configurable, and may be adjusted as needed within a given implementation of network 10.

Indeed, the various methods and system implementations of the present invention are subject to much variation. For example, either the per-sector or the inter-sector reverse link control, or some combination thereof may be used within a given network 10. Thus, the present invention is not limited by the exemplary details above. Rather the present invention is limited only by the scope of the claims below, and their reasonable equivalents.

What is claimed is:

1. A method of reverse link flow control for a sector in a high rate packet data network serving a plurality of access terminals, said method comprising:
    determining an individual interference contribution of each access terminal served by said sector based on a reverse data channel rate of said access terminal by:
        determining channel gains for selected reverse link channels from said access terminal; and
        weighting said channel gains by a pilot signal-to-noise ratio (pilot SNR) for said access terminal;
    estimating total sector interference for said sector based on said individual interference contributions of said access terminals; and
    setting a reverse link flow control indicator regulating the reverse data channel rates used by said access terminals based on said total sector interference.

2. The method of claim 1 further comprising determining said pilot SNR by estimating a nominal pilot SNR value.

3. The method of claim 2 further comprising weighting said individual interference contribution by a scaling factor based on a packet error rate of said access terminal.

4. The method of claim 1 further comprising determining said pilot SNR by measuring pilot SNR for said access terminal.

5. The method of claim 1 wherein determining channel gains for selected reverse channels from said access terminal comprises determining a reverse data channel gain and a reverse data rate control channel gain.

6. The method of claim 5 wherein determining a reverse data channel gain and a reverse data rate control channel gain comprises accessing pre-defined channel gain value information.

7. The method of claim 6 wherein accessing pre-defined channel gain value information comprises accessing stored channel gain value information comprising predefined gain values corresponding to said reverse data channel gain and said reverse data rate control channel gain.

8. The method of claim 7 further comprising selecting one of a number of defined gain values stored for said reverse data channel gain in said stored channel gain value information based on said reverse data channel rate of said access terminal.

9. The method of claim 6 wherein an air interface standard used by said network specifies said channel gains for said selected reverse channels, and further comprising configuring said stored channel gain values based on said air interface.

10. The method of claim 1 wherein weighting said channel gains by a pilot signal-to-noise ratio (pilot SNR) for said access terminal comprises multiplying a sum of said channel gains for said selected reverse channels by said pilot SNR.

11. The method of claim 1 wherein estimating total sector interference for said sector based on said individual interference contributions of said access terminals comprises summing said individual contributions for all said access terminals served by said sector.

12. The method of claim 1 further comprising compensating said estimate of total interference for soft handoff, wherein one or more of said access terminals served by said sector may be in soft handoff with one or more other sectors in said network.

13. The method of claim 12 wherein compensating said estimate of total interference for soft handoff comprises scaling said individual contributions by a weighting factor based on packet error rates of said access terminals.

14. The method of claim 13 wherein scaling said individual contributions by a weighting factor based on packet error rates of said access terminals comprises:
    determining a packet error rate of each access terminal;
    setting said weighting factor based on said packet error rate; and
    scaling said individual contribution of said access terminal by said weighting factor.

15. The method of claim 14 wherein setting said weighting factor based on said packet error rate comprises setting said weighting factor to a first value if said packet error rate is below an error threshold and to a second value if said packet error rate is said error threshold.

16. The method of claim 1 wherein setting a reverse link flow control indicator regulating the reverse data channel rates used by said access terminals based on said total sector interference comprises:

determining a remaining reverse capacity based on said total sector interference; and setting said reverse flow control indicator to indicate a busy condition when said reverse capacity falls below a reserve capacity threshold.

17. The method of claim 1 wherein setting a reverse link flow control indicator regulating the reverse data channel rates used by said access terminals based on said total sector interference comprises setting said reverse flow indicator to indicate a busy condition when said estimate of total interference is above a first threshold, and setting said reverse flow indicator to indicate a not busy condition when said estimate of total interference returns below a second threshold lower than said first threshold.

18. The method of claim 1 further comprising sending said estimate of total interference to a central controller operative to perform inter-sector reverse link flow control based on said estimate of total interference from said sector and one or more other estimates of total interference from one or more other sectors in said network.

19. The method of claim 18 further comprising sending estimated frequency reuse efficiency to said central controller for use in inter-sector reverse link flow control.

20. The method of claim 19 further comprising determining said estimated frequency reuse efficiency for said sector by estimating a first number of access terminals contributing to outer-cell interference in said sector, and a second number of access terminals contributing to in-cell interference in said sector.

21. The method of claim 20 wherein estimating a first number of access terminals contributing to outer-cell interference in said sector, and a second number of access terminals contributing to in-cell interference in said sector comprises evaluating a pilot channel signal-to-noise ratio for each said access terminal to determine whether said access terminal belongs to said first number or said second number.

22. The method of claim 20 wherein estimating a first number of access terminals contributing to outer-cell interference in said sector, and a second number of access terminals contributing to in-cell interference in said sector comprises evaluating a packet error rate (PER) for each said access terminal to determine whether said access terminal belongs to said first number or said second number.

23. The method of claim 20 wherein determining said estimated frequency reuse efficiency for said sector by estimating a first number of access terminals contributing to outer-cell interference in said sector, and a second number of access terminals contributing to in-cell interference in said sector comprises computing a ratio of total interference to in-cell interference, wherein said total interference comprises total outer-cell interference and total in-cell interference, and further comprising computing said total outer-cell and total in-cell interference based on said first and second numbers.

24. The method of claim 23 wherein computing said outer-cell and in-cell interference based on said first and second numbers comprises summing individual interference contributions for said access terminals belonging to said first number as said total outer-cell interference.

25. The method of claim 23 wherein computing said outer-cell and in-cell interference based on said first and second numbers comprises summing individual interference contributions for said access terminals belonging to said second number as said total in-cell interference.

26. A method of reverse link flow control in a wireless communication network comprising a plurality of sectors, the method comprising:

regulating reverse link data rates for access terminals in a first sector in dependence on a measured reverse link loading of a second sector to reduce reverse link interference in said second sector caused at least in part by said access terminals controlled by said first sector; and cooperatively regulating reverse link data rates for a plurality of access terminals served by a plurality of sectors in said network, including said first and second sectors, to improve reverse link capacity utilization for at least one of said plurality of sectors.

27. The method of claim 26 wherein regulating reverse link data rates for access terminals in a first sector in dependence on the reverse link loading of the second sector to reduce reverse link interference in said second sector caused at least in part by said access terminals controlled by said first sector comprises:

estimating total sector interference in said second sector; and causing said first sector to reduce reverse link data rates for at least some of said access terminals controlled by said first sector if said sector interference in said second sector exceeds a defined threshold, thereby reducing said total sector interference in said second sector.

28. The method of claim 27 wherein estimating said total sector interference in said second sector comprises:

determining an individual interference contribution of each access terminal served by said sector based on a reverse data channel rate of said access terminal; and estimating said total sector interference for said sector based on said individual interference contributions of said access terminals.

29. The method of claim 28 wherein determining an individual interference contribution of each access terminal served by said sector based on said reverse data channel rate of said access terminal comprises:

determining channel gains for selected reverse link channels from said access terminal; and weighting said channel gains by a pilot signal-to-noise ratio (pilot SNR) for said access terminal.

30. The method of claim 29 wherein determining channel gains for selected reverse channels from said access terminal comprises determining a reverse data channel gain and a reverse data rate control channel gain.

31. The method of claim 30 wherein determining a reverse data channel gain and a reverse data rate control channel gain comprises accessing pre-defined channel gain value information.

32. The method of claim 27 wherein causing said first sector to reduce reverse link data rates for at least some of said access terminals controlled by said first sector comprises adjusting a defined threshold for total sector interference used by said first sector to regulate reverse link data rates of said access terminals served by said sector.

33. A method of reverse link flow control in a wireless communication network comprising a plurality of sectors, the method comprising:

receiving total sector interference estimates indicative of sector loading from a plurality of sectors within said network at a central processor;

controlling reverse link throughput in at least a first sector in dependence on said interference estimates of at least a second sector to reduce interference in at least said second sector; and inter-dependently controlling reverse link throughputs in one or more of said plurality of sectors, including said first and second sectors, to reduce inter-sector interference.

34. The method of claim 33 wherein controlling reverse link throughput in at least a first sector in dependence on said interference estimates of at least a second sector to reduce interference in at least said second sector comprises adjusting one or more flow control parameters used by said first sector in regulating reverse link data rates of access terminals controlled by said first sector.

35. The method of claim 34 wherein adjusting one or more flow control parameters used by said first sector in regulating reverse link data rates of access terminals controlled by said first sector comprises adjusting one or more interference thresholds used by said first sector in determining whether a current level of estimated total sector interference for said first sector necessitates indicating a busy condition to said access terminals controlled by said first sector, which indication causes at least some of said access terminals to reduce their reverse link data rates.

36. The method of claim 35 wherein adjusting one or more interference thresholds used by said first sector comprises transferring one or more updated interference threshold values to said first sector.

37. The method of claim 33 wherein controlling reverse link throughput in at least a first sector in dependence on said interference estimates of at least a second sector to reduce interference in at least said second sector comprises causing a radio base station in said first sector to reduce reverse link data rates for at least some of said access terminals controlled by said first sector to reduce interference in said second sector.

38. The method of claim 33 further comprising inter-dependently controlling reverse link throughputs of said plurality of sectors to increase a total network reverse link throughput.

39. The method of claim 33 wherein controlling reverse link throughput in at least a first sector in dependence on said interference estimates of at least a second sector to reduce interference in at least said second sector comprises:
evaluating said total interference estimates from said plurality of sectors;
adjusting interference threshold values used by one or more of said plurality of sectors in regulating reverse link data rates of pluralities of access terminals respectively served by said one or more of said sectors to minimize inter-sector interference; and
sending said adjusted interference thresholds to respective ones of said one or more of
said sectors.

40. The method of claim 33 further comprising receiving frequency reuse efficiency estimates from said plurality of sectors.

41. The method of claim 40 further comprising controlling reverse link throughput in one or more sectors, including said first sector, in dependence on said interference estimates and said efficiency estimates from one or more other sectors, including said second sector.

42. The method of claim 40 further comprising:
identifying a sector in said plurality of sectors having a reserve reverse link capacity below a defined threshold, as indicated by said interference estimate for said sector, and having a high frequency reuse efficiency, as indicated by said efficiency estimate for said sector; and
causing one or more other sectors in said plurality of sectors that are adjacent to said identified sector to reduce their reverse link throughput, thereby reducing interference in said identified sector.

43. The method of claim 40 wherein receiving frequency reuse efficiency estimates from said plurality of sectors comprises receiving one of said efficiency estimates from a radio base station in each one of said plurality of sectors at a central processor in a base station controller controlling said radio base stations in said plurality of sectors.

44. The method of claim 43 wherein receiving said interference estimates from said plurality of sectors comprises receiving said interference estimates from said radio base stations.

45. The method of claim 44 wherein each one of said radio base stations regulates reverse link throughput for the corresponding sector based on setting a reverse activity indicator, and further comprising controlling reverse link throughput in one or more of said sectors in inter-dependent fashion based on said interference estimates and said efficiency estimates.

46. The method of claim 45 wherein controlling reverse link throughput in one or more of said sectors in inter-dependent fashion based on said interference estimates and said efficiency estimates comprises transmitting adjusted interference threshold values used by said radio base stations in setting said reverse activity indicator.

47. A radio base station regulating reverse link data rates for a plurality of access terminals, said radio base station comprising:
a plurality of radio interfaces to support a plurality of connections with said access terminals;
a processing system to estimate total sector interference by determining individual interference contributions for said plurality of access terminals using defined channel gain information;
a threshold detector to generate a control signal by evaluating said estimated total sector interference with respect to a capacity threshold; and
a reverse activity modulator to set a reverse activity indicator to a busy or not busy state responsive to said control signal.

48. The radio base station of claim 47 further comprising a demodulation circuit in each one of said radio interferences to provide pilot channel signal to noise ratio information to said processing system for the connection corresponding to said radio interference, and wherein said processing system uses said pilot channel signal to noise ratio information in determining said individual interference contributions for said connections.

49. The radio base station of claim 47 further comprising a storage element operative to be hold said defined channel gain information, thus permitting said processing system to access said defined channel gain information for estimating said individual interference contributions.

50. A base station controller for use in a wireless communication network employing reverse link flow control, said base station controller comprising a central processor programmed to:
receive estimates of reverse link loading for a sector from a plurality of radio base stations;
process said estimates of reverse link loading from said plurality of radio base stations to compute a flow control parameter for one or more of said radio base stations;
wherein said flow control parameter computed for each radio base station is dependent on an estimate of reverse link loading for a sector associated with at least one other radio base station;

receive frequency reuse efficiency estimates from said radio base stations;

identify one or more first radio base stations having high estimates of reverse link loading and high efficiency estimates; and compute flow control parameters for one or more second radio base stations adjacent to said one or more first radio base stations, such that interference at said first radio base stations caused by access terminals controlled by said second radio base stations is reduced.

51. The base station controller of claim 50 wherein said central controller is further programmed to send said flow control parameters to said radio base stations.

* * * * *